Sept. 10, 1940.  T. A. CONLON  2,213,953
AUTOMATIC GUN
Filed Feb. 18, 1938  7 Sheets-Sheet 1
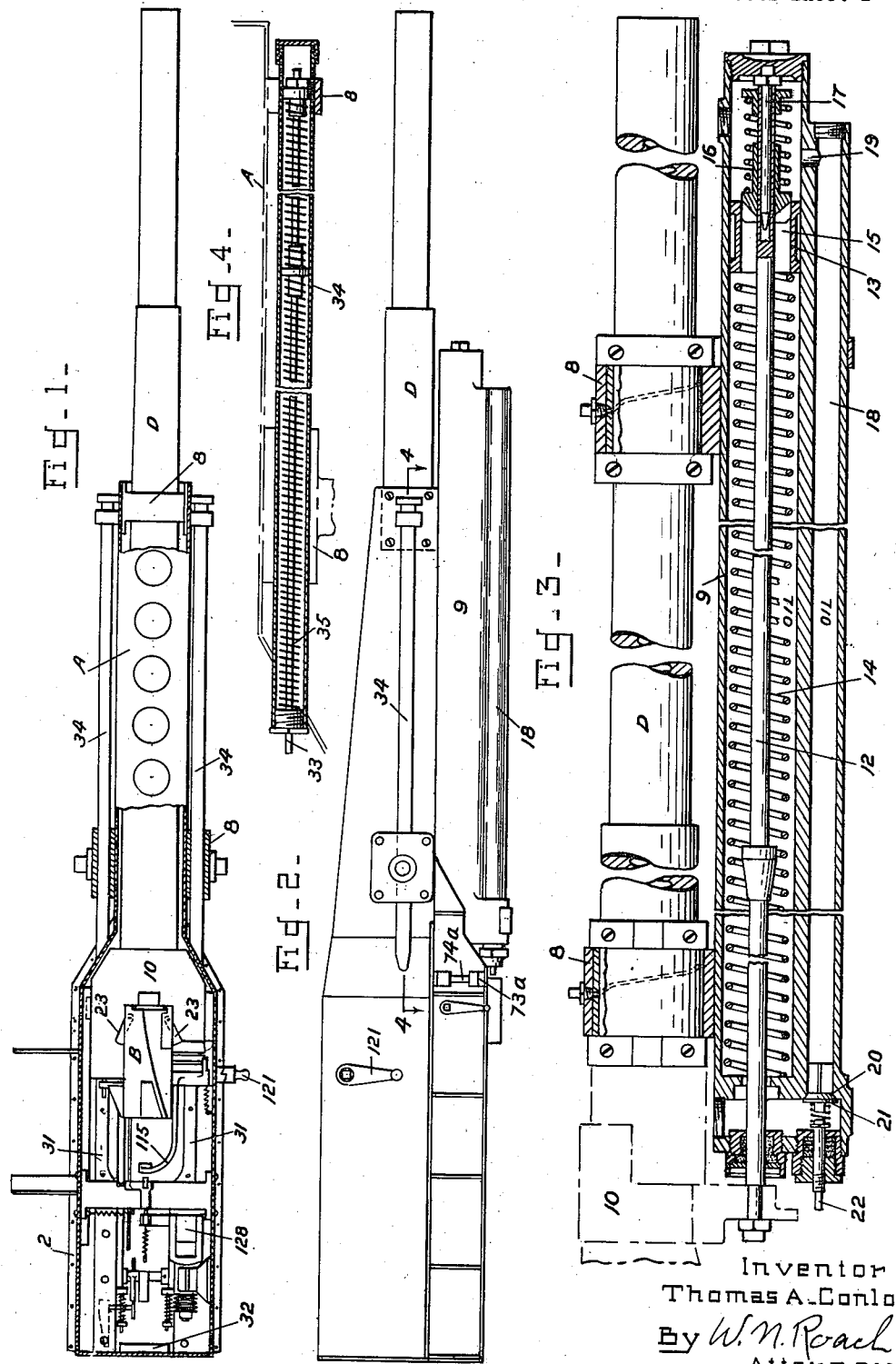
Inventor
Thomas A. Conlon
By W. N. Roach
Attorney Sept. 10, 1940.    T. A. CONLON    2,213,953
AUTOMATIC GUN
Filed Feb. 18, 1938    7 Sheets-Sheet 2
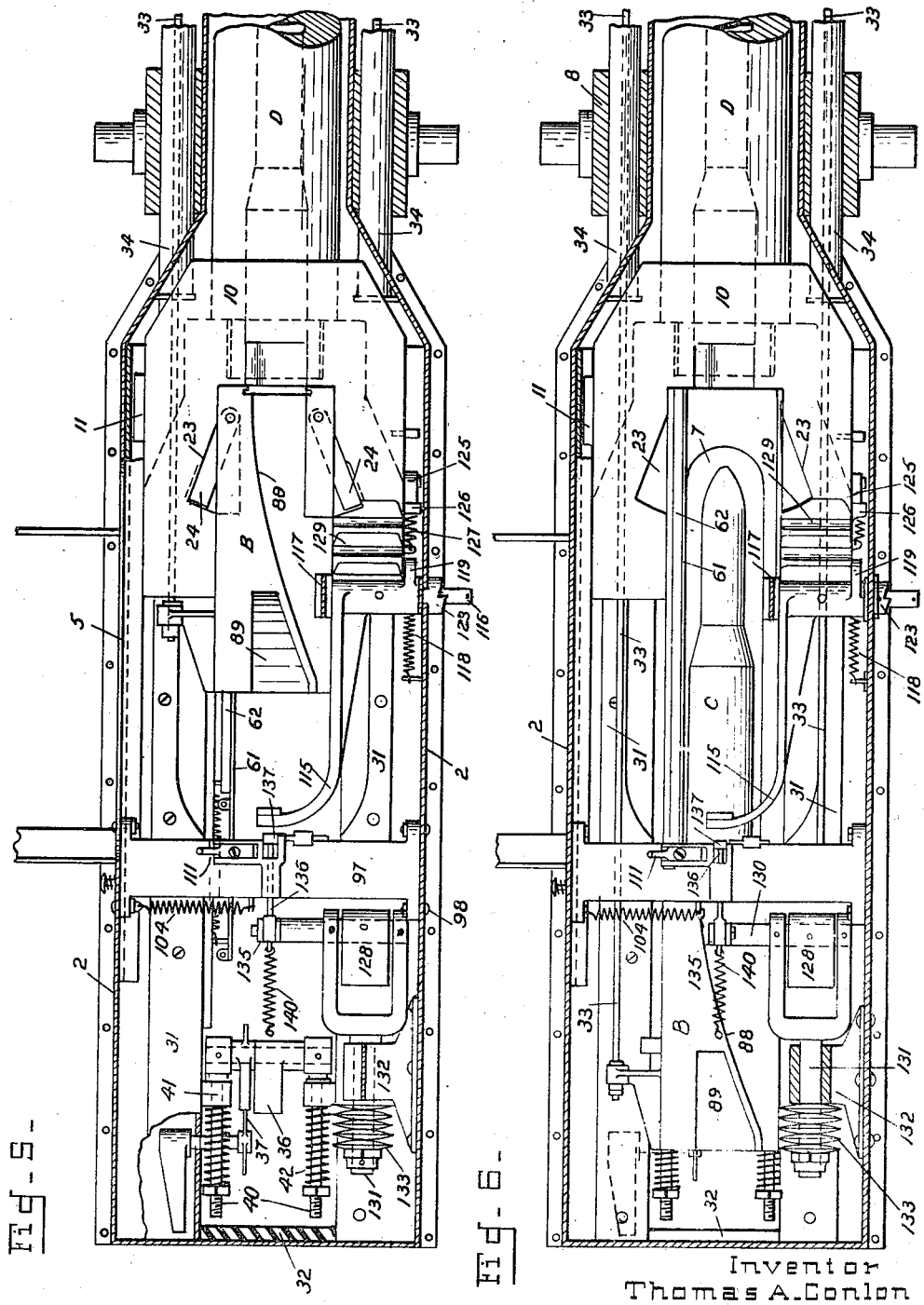
Inventor
Thomas A. Conlon
By W. N. Roach
Attorney

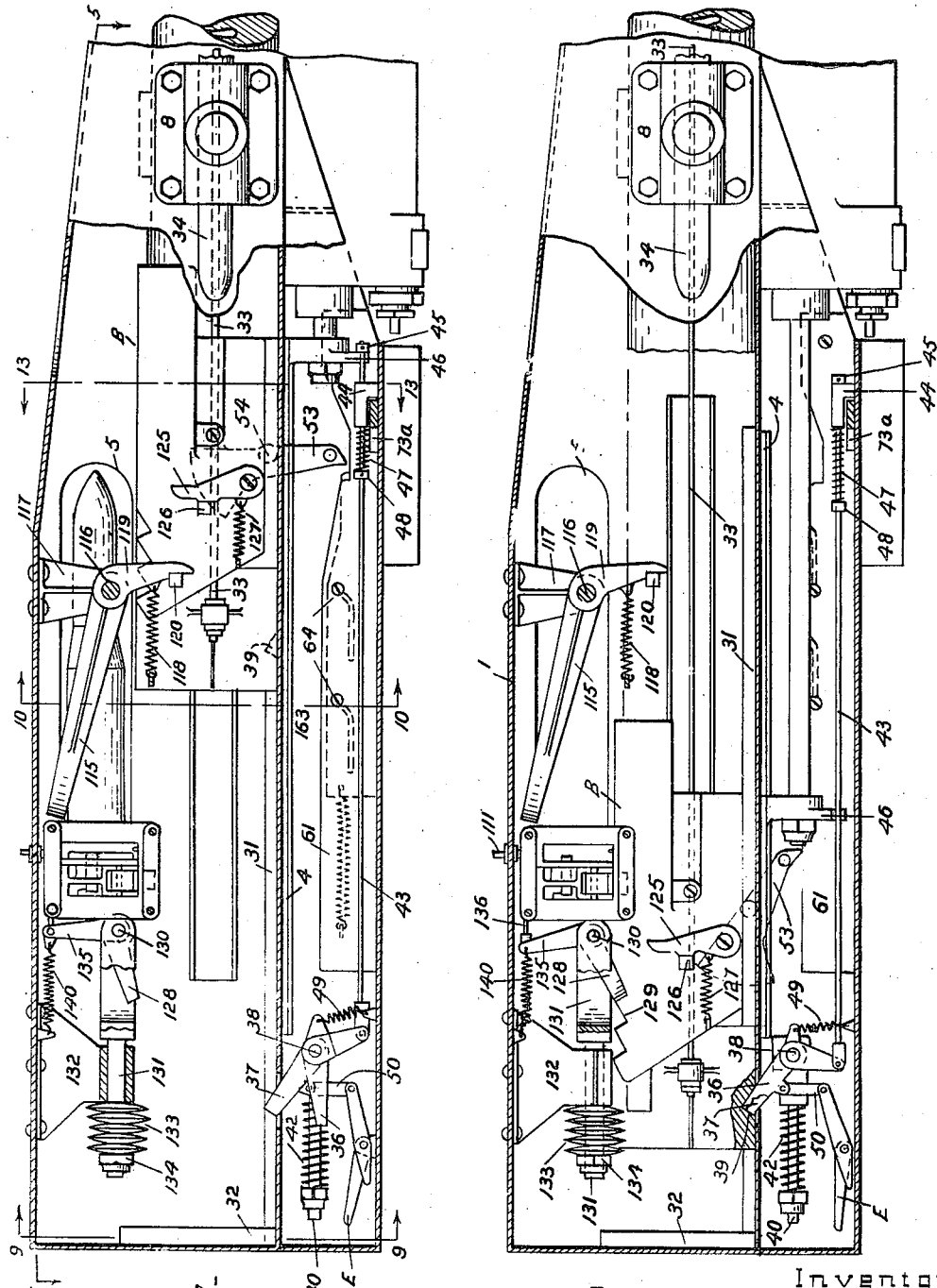

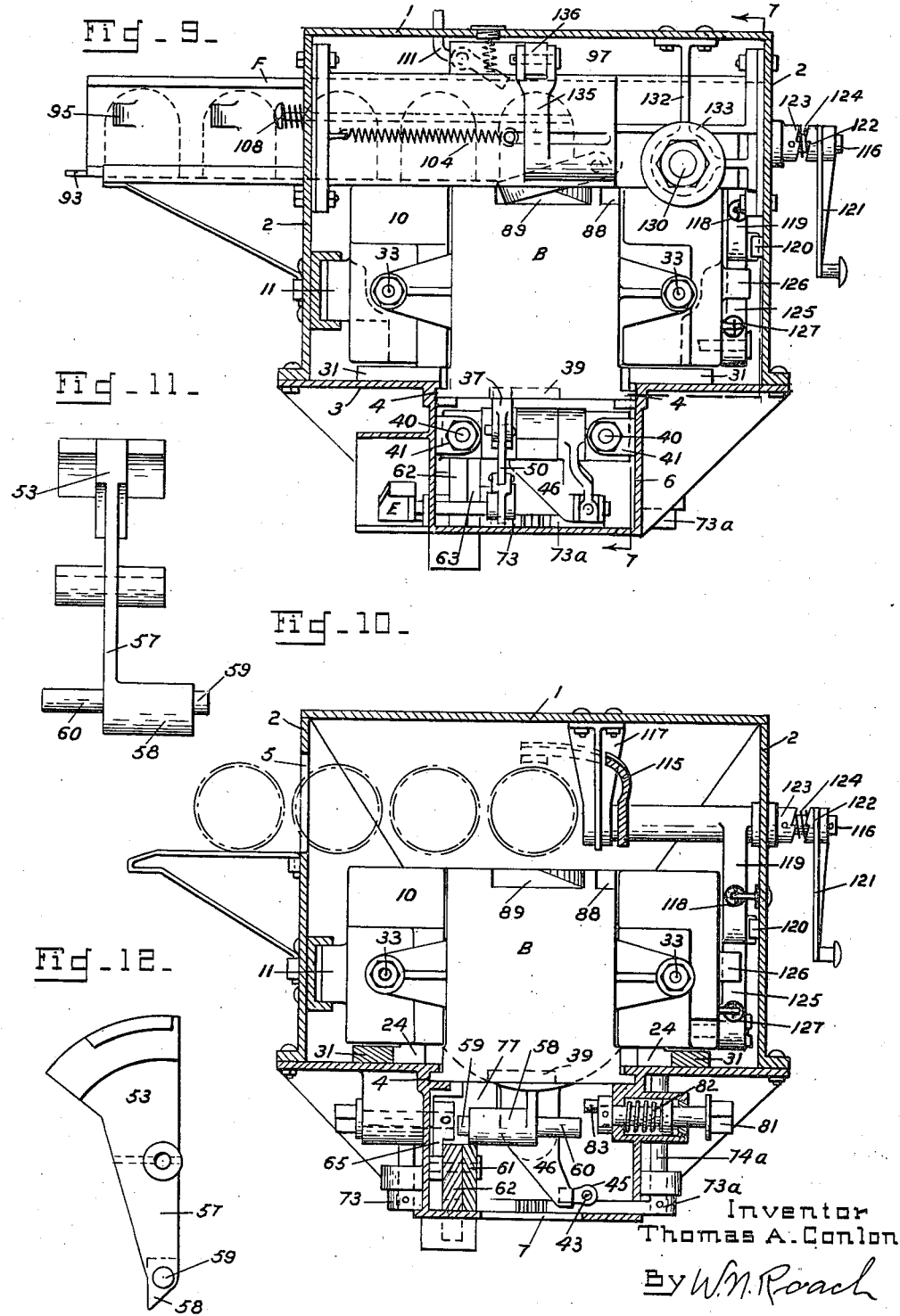

Sept. 10, 1940.　　　T. A. CONLON　　　2,213,953
AUTOMATIC GUN
Filed Feb. 18, 1938　　　7 Sheets-Sheet 5
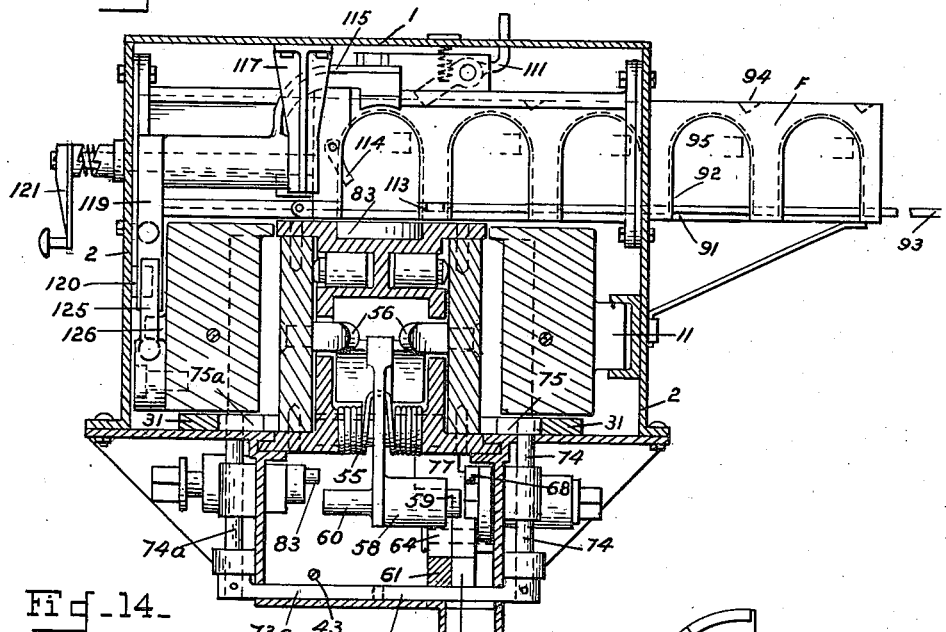
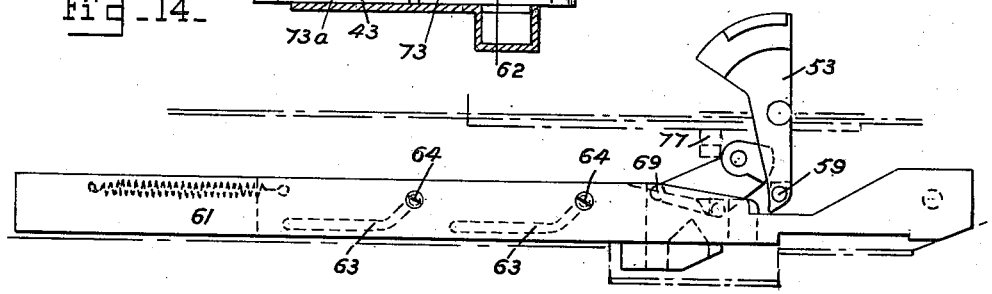
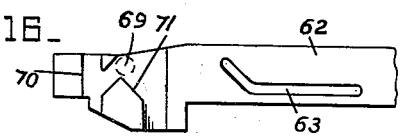
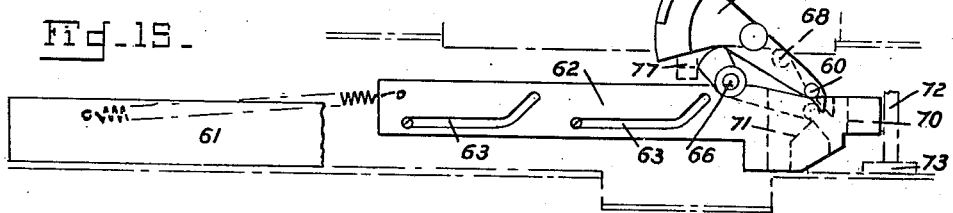
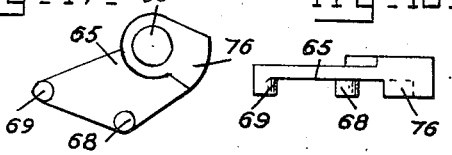
Inventor
Thomas A. Conlon
By W. M. Roach
Attorney Inventor
Thomas A. Conlon
By W. N. Roach
Attorney Sept. 10, 1940.  T. A. CONLON  2,213,953
AUTOMATIC GUN
Filed Feb. 18, 1938  7 Sheets-Sheet 7
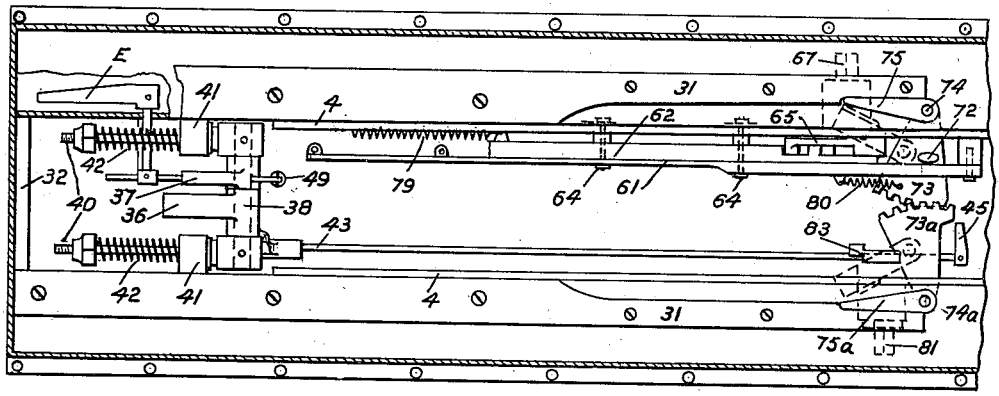
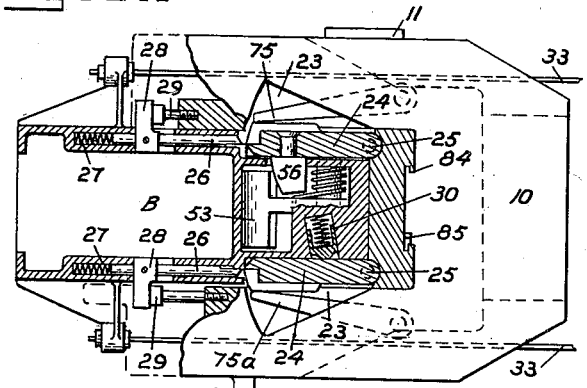
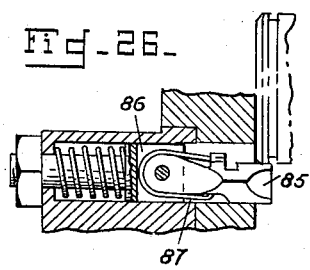
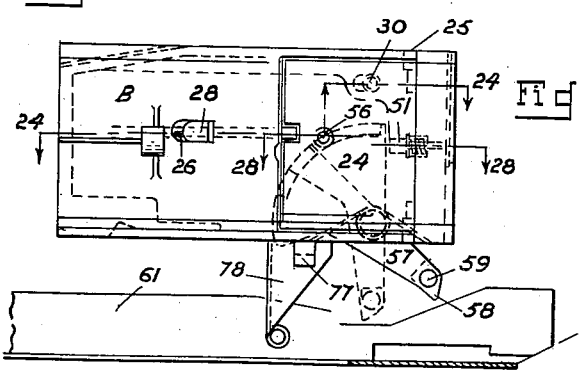
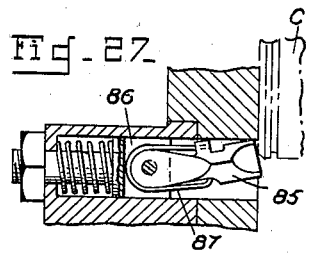
Inventor
Thomas A. Conlon
By W. N. Roach
Attorney Patented Sept. 10, 1940

2,213,953

UNITED STATES PATENT OFFICE 2,213,953

AUTOMATIC GUN

Thomas A. Conlon, Silver Spring, Md., assignor to the Government of the United States of America, as represented by the Secretary of War Application February 18, 1938, Serial No. 191,258

14 Claims. (Cl. 89—3)

(Granted under the act of March 3, 1883, as amended April 30, 1928; 370 O. G. 757)

The invention described herein may be manufactured and used by or for the Government for governmental purposes, without the payment to me of any royalty thereon.

The subject of this invention is an Automatic Gun especially adapted for large projectiles which are loaded with an explosive.

A gun of 37 mm. caliber having a muzzle velocity of 1400–1600 f. p. s. employs a cartridge with an overall length of about 7 inches while a gun of the same caliber with a muzzle velocity of 2800–3000 f. p. s. employs a cartridge about 12½ inches in length and of greater weight. It is also necessary in a gun of high muzzle velocity of provide for an appropriate length of recoil of the movable parts in order to insure stability of the mount during firing.

The purpose of this invention is to provide an automatic gun having a long recoil and a high muzzle velocity. The gun has various structural arrangements which will insure positive feeding of a long and heavy cartridge, a novel breech locking mechanism associated with the firing mechanism, and an effective means for manually unlocking the breech bolt so that it may be retracted for initial loading and for correcting stoppages.

One practical embodiment of the invention is shown by way of illustration in the accompanying drawings, wherein:

Fig. 1 is a plan view, with parts broken away, of a gun constructed in accordance with the invention;

Fig. 2 is a view in right side elevation;

Fig. 3 is a longitudinal sectional view of the recoil mechanism;

Fig. 4 is a detail sectional view on the line 4—4 of Fig. 2;

Fig. 5 is a plan view of the rear portion of the gun showing the breech bolt in battery;

Fig. 6 is a similar view with the breech bolt retracted;

Fig. 7 is a view on line 7—7 of Fig. 9 showing the breech bolt in battery;

Fig. 8 is a similar view with the breech bolt and barrel retracted;

Fig. 9 is a sectional view taken generally on the line 9—9 of Fig. 7;

Fig. 10 is a sectional view taken generally on the line 10—10 of Fig. 7 and showing the hammer in cocked position just prior to its release;

Figs. 11 and 12 are detail views in front and side elevation of the hammer;

Fig. 13 is a sectional view taken generally on the line 13—13 of Fig. 7;

Figs. 14 and 15 are detail views showing the means for manually cocking the hammer;

Fig. 16 is a detail view in side elevation of the front portion of the movable cam;

Figs. 17 and 18 are respectively views in side elevation and in plan of the lever for the movable cam.

Fig. 23 is a plan view showing the means for manually unlocking the breech bolt and the latches for holding the breech bolt in retracted position;

Fig. 24 is a sectional view on the line 24—24 of Fig. 25 and showing the parts just after unlocking the locking plates;

Fig. 25 is a view in side elevation of the breech bolt;

Figs. 26 and 27 are views of the cartridge supporting catch;

Fig. 28 is a sectional view on the line 28—28 of Fig. 25.

Figure 19:
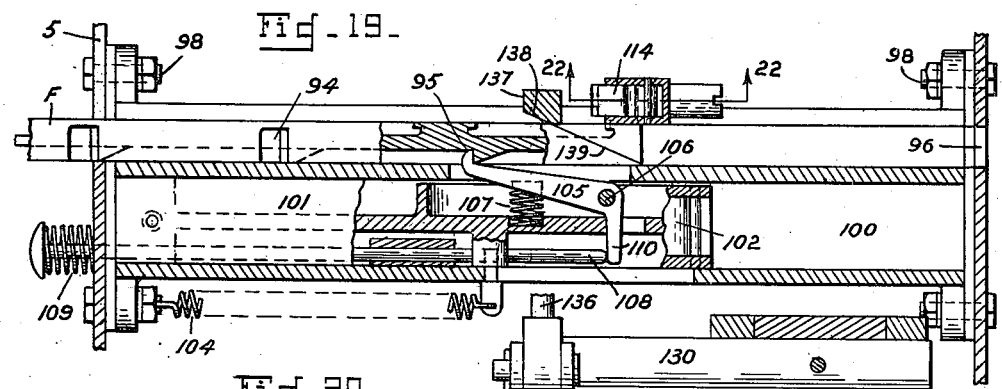
Fig. 19 is a plan view, with parts in section, of the cartridge feed mechanism.

Referring to the drawings by characters of reference:

The gun comprises a casing A having a top plate 1, (Figs. 8–10) side plates 2—2 and a bottom plate 3 which extends only over the wide rear portion and has grooves 4—4 for slidably mounting a breech bolt B. The left side plate has an opening 5 through which a cartridge C enters the casing, and the bottom plate, which has a central longitudinally extending channel 6, is provided with an opening 7 through which a cartridge or the empty cartridge is ejected from the casing.

The front narrow portion of the casing carries a pair of bearings 8—8 (Figs. 1-3) which slidably receive and support a gun barrel B and also serves to carry a cylinder 9 of a recoil and recuperator mechanism. The gun barrel is threaded into a breech ring 10 which has a lug 11 (Fig. 10) riding in a groove in the casing and serving to prevent the gun from turning when the projectile is taking the rifling of the barrel.

A piston rod 12 secured to the breech ring extends forwardly into the cylinder 9 and carries a piston head 13 which is normally maintained near the front end of the cylinder by a spring 14 and by means of oil which fills the cylinder in rear of the piston head. The piston head is formed with oil passages 15 normally closed by the usual throttling valve 16. A conventional spear head type buffer 17 fixed to the front end of the cylinder enters the hollow front end of the piston rod.

The cylinder includes a by-pass chamber 18 which is in fluid communication with the cylinder by means of a port 19 in front of the piston head and a port 20 at the rear. The port 20 is normally closed by a valve 21, and the amount of opening of the barrel is regulated by an adjustably mounted stem 22.

The movement of the gun in recoil is arrested in the usual manner by compression of the spring 14 and by throttling of the oil past the valve 16, the valve 21 being closed. At the end of recoil, the spring moves the piston forwardly, and this movement closes valve 16, forces the oil through by-pass chamber 18 and past the valve 21 into the recoil cylinder in rear of the piston head. The speed of counterrecoil is controlled by the amount of opening of valve 21, a small opening increasing the time for return into battery.

The breech ring 10 is formed with a vertical opening for receiving the sliding breech bolt B (Figs. 5 and 6) and for permitting the cartridge C to be lowered into line with the bore of the barrel. The walls on opposite sides of the opening are provided with notches 23 which are adapted to receive locking plates 24 (Figs. 24-25) which are mounted on pivot pins 25—25 and are arranged to move in and out of recesses in the side walls of the bolt. The plates are each held in their respective recesses by means of sliding latches 26—26 which are driven home by springs 27—27. Each latch has a laterally projecting lug 28 which engages a step 29 on the breech ring when the bolt arrives in battery and serves to retract the latch. A spring pressed plunger 30 is provided for each locking plate 24 to move it into the notch 23 when its latch is withdrawn.

A pair of spaced and longitudinally extending cam plates 31—31 (Figs. 5 and 23) are secured to the bottom plate 3 at the sides of the channel 6 and under the breech ring (Figs. 9 and 10). The cam plates are engaged by the lower portion of the locking plates 24 and are arranged to swing the locking plates out of the notches 23 of the breech ring and into their recesses in the breech bolt when the gun barrel and breech have traveled about 9 inches in recoil. During the continued movement in recoil, the cam plates 31 maintain the locking plates 24 out of the notches 23 so that the gun barrel may return independently into battery while the breech bolt may move an additional distance until it strikes a rubber block 32 on the rear plate of the casing. The gun barrel normally recoils about 13 inches and the breech bolt recoils about 17 inches.

The mechanism in the cylinder 9 serves to check the recoil movement of the barrel and breech bolt and to return the barrel into battery. Since the breech bolt was unlocked from the barrel on the recoil stroke, a separate mechanism is provided to return it into battery and this consists of a pair of rods 33—33 (Figs. 4 and 6) secured to the breech bolt and inserted in tubes 34 fixed to the casing A. One or more springs 35 are confined between the front end of each rod and the rear end of its tube.

The breech bolt and barrel are separated to permit extraction of the empty cartridge case and insertion of a new round, and the bolt is held in a retracted position 15 inches out of battery. The mechanism for accomplishing this holding operation comprises a gun-controlled latch 36 (Figs. 5, 7-9, and 23) and a trigger controlled latch 37 both of which are pivotally mounted on a pin 38 and adapted to move into and out of a recess 39 in the bottom of the breech bolt. The pin 38 constitutes a cross head for a pair of rods 40—40 which are slidably mounted in bearings 41—41 in the bottom plate of the casing and are disposed in the channel 6. A spring 42 on each rod is confined between the rear end of the rod and the bearing and these springs serve as shock absorbers when the counter-recoiling breech bolt engages the latches.

The latch 36 is locked by means of a rod 43 whose front portion passes through a block 44 and carries a head 45 which is disposed in front of an arm 46 on the breech ring. A spring 47 on the rod is confined between the block 44 and a collar 48 on the rod. When the gun barrel moves in recoil, the spring 47 retracts the rod 43 and moves the latch 36 into position to enter the recess in the breech bolt. When the gun barrel returns into battery the arm 46 strikes the head 45 and moves the latch out of engagement with the breech bolt.

The latch 37 is normally held in position to engage the breech bolt by means of a spring 49 and is moved out of engagement with the breech bolt by means of a trigger E to which it is connected by a link 50.

The firing mechanism in the breech bolt comprises a firing pin 51 (Figs. 24-28) normally retracted by a spring 52 and a hammer 53 (Figs. 11-13) mounted on a pin 54 and actuated by a driving spring 55. Lugs 56—56 on the locking plates 24 are interposed in the path of the hammer to maintain it in cocked position and to prevent firing at all times when the breech bolt is unlocked from the breech ring. When the locking plates 24 swing outwardly into their locking position, the lugs 56 clear the hammer 53 which is then free to be fired. A depending arm 57 on the hammer has a laterally projecting finger 58 and studs 59 and 60 on opposite sides of the finger. The finger is adapted to engage a fixed cam plate 61 during initial movement of the breech bolt in order to cock the hammer and thereafter it rides on the cam plate to hold the hammer cocked until the breech bolt again approaches battery.

In order to permit cocking of the hammer with the breech bolt in battery, which operation is necessary for manual unlocking of the breech bolt when in battery, there is provided a movable cam plate 62 (Figs. 14-18) which is arranged to be displaced forwardly and upwardly. The movable plate 62 is positioned alongside the fixed plate 61 and has a pair of slots 63—63 each of which receives one of a pair of pins 64 secured to the fixed plate. The slots extend longitudinally of the cam plate 62 and have an inclined forward portion to cause elevation of the cam plate.

A lever 65 mounted on a shaft 66 with a squared end 67 for application of a crank handle, is provided with a pair of pins 68 and 69 respectively engaging the surfaces 70 and 71 on the movable cam plate 62. These pins act successively on the cam plate to move it forwardly and upwardly during which movement the cam plate acts on the stud 59 to cock the hammer and strikes an upright pin 72 on a longitudinally disposed segmental gear 73 (Figs. 13 and 23). The gear 73 swings on an upright shaft 74 whose upper end carries a finger 75 which engages the locking plate 24 on its side of the gun and is adapted to move the locking plate out of engagement with the breech ring. The gear 73 drives a similar mechanism for the other locking plate 24 and consist of a mating segmental gear 73a, shaft 74a and finger 75a.

When the breech has been unlocked, a projection 76 on the lever 65 (Figs. 15 and 18) strikes a lug 77 on the breech block to initiate its separation from the breech ring, and to move it rearwardly a sufficient distance to enable the latches 26 to move into position for holding the locking plates 24, which in turn hold the hammer in cocked position. The breech block is provided with a handle or bracket 78 (Fig. 25) whereby it may be manually retracted. For the sake of clarity the handle is not shown in some of the views. Springs 79 and 80 (Fig. 23) restore the movable cam plate 62 and the gears 73 to their normal position.

On the right side of the casing there is provided an axially displaceable shaft 81 (Figs. 10 and 23) having a squared end for application of a crank handle and provided with a spring 82 to normally hold it in the out position. A lever 83 on the inner end of the shaft is adapted when the shaft is moved "in" and rotated to strike the stud 60 on the hammer and move it to cocked position. On continued rotation of the shaft, the lever 83 passes the stud and the hammer is fired by its spring 55. This mechanism is employed to repeat the firing action in the event of a misfire.

The front face of the breech bolt is provided with spaced grooves 84—84 (Figs. 24-27) for receiving the rim of the cartridge C and it is also provided with a catch 85 for supporting the cartridge in line with the firing pin and in line with the bore of the barrel. The catch is pivotally mounted on a spring pressed plunger 86 and is normally held in extruded position to be engaged by the rim of the cartridge. When the breech bolt arrives in battery and inserts the cartridge into the chamber of the barrel, the catch 85 strikes the breech ring and is forced rearwardly to clear the cartridge. A spring 87 then acts on the catch 85 and swings it towards the axis of the breech bolt where it engages against the rear face of the rim until the cartridge is removed from the face of the breech bolt.

The upper face of the breech bolt is provided with a feed cam 88 (Fig. 5) and with a return cam 89 both of which function in connection with the cartridge feed mechanism.

Figure 20:
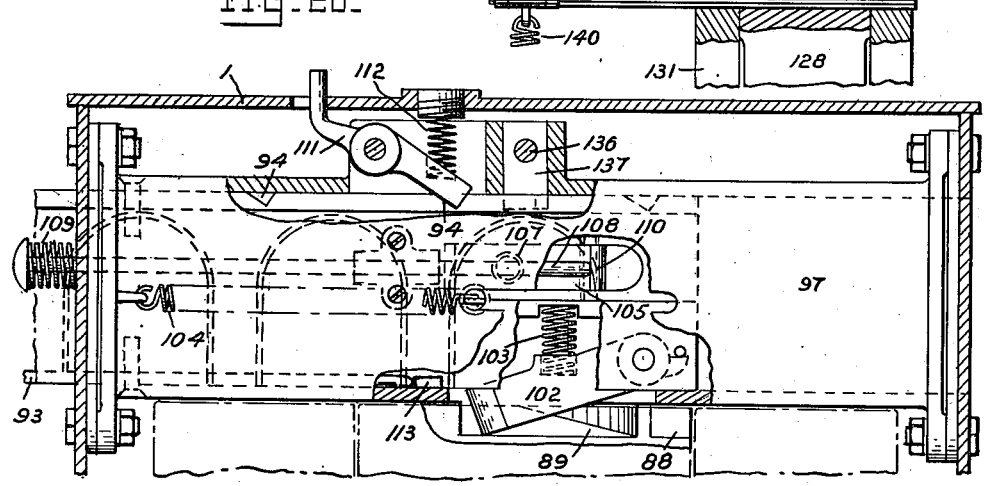
Fig. 20 is a view in rear elevation thereof with parts in section.
Figure 21:
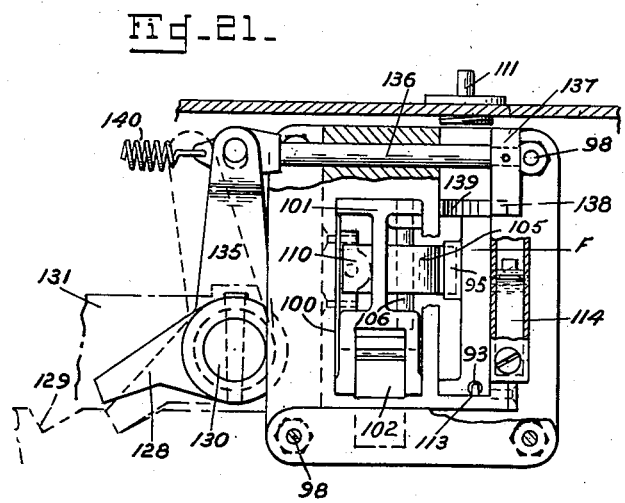
Fig. 21 is a view in right side elevation with parts in section.
Figure 22:
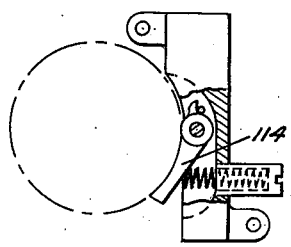
Fig. 22 is a sectional view on the line 22—22 of Fig. 19.

The cartridges that are to be fed into the gun are carried by a clip F (Figs. 13 and 19-21) which is formed with a plurality of spaced recessed seats 90 having an open bottom 91 and a grooved margin 92. The cartridges are retained in the seats by means of a rod 93 which is slidably inserted in the lower portion of the clip and extends across the open bottom of the seats. The upper surface of the clip is provided with spaced notches 94 and the rear surface is provided with spaced angular teeth 95. The loaded clip is fed into the gun from left to right entering the opening 5 (Fig. 10) in the left side plate and the empty clip emerges through an opening 96 in the right side plate.

A feed guide 97 extends transversely of the casing and is secured to the side plates by means of bolts 98. The front face is formed with a channel 99 for slidably receiving the clip F and the body of the guide is formed with a channel 100 for a feed slide 101. The slide 101 carries a pivoted feed lever 102 which is depressed by a spring 103 into engagement with the upper surface of the breech bolt. A spring 104 normally holds the slide to the left so that when the breech bolt is held in the retracted position for feeding, the feed lever 102 will engage the front portion of the cam 88. As the breech bolt moves forwardly, the lever and the slide are moved to the right to advance the clip with the next round into position to be subsequently transferred to the breech bolt. When the breech bolt has moved forward sufficiently to clear the lever, the spring 104 restores the slide and lever to their normal position at the left (Fig. 20) so that on the next recoil stroke of the breech bolt the lever will be raised by the return cam 89 and ride on the upper surface of the breech bolt until it drops into engagement with the cam 88.

A feed pawl 105 mounted on a pin 106 in the slide 101 is normally held against the rear face of the clip by a spring 107 and has a hooked extremity for engaging with the teeth 95 to advance the clip when the slide is moved to the right. The feed pawl may be disengaged from a tooth of the clip when it is desired to remove the clip by means of a rod 108 which, when pushed inwardly against the action of a return spring 109 engages an arm 110 on the feed pawl 105 and swings it rearwardly. A stop pawl 111 carried by the guide is normally moved by a spring 112 into one of the notches 94 to hold the clip in advanced position while the slide returns to the left for the purpose of repositioning the feed lever 102 and causing the feed pawl 105 to engage the next tooth on the clip.

When the clip is inserted in the guide, the rod 93 engages a stop 113 so that the cartridge moving into position to be transferred to the breech bolt will be free to be moved out of its seat. A spring pressed lever 114 carried by the guide 97 serves to stop the cartridge and to support it after removal of the rod 93.

The cartridge is transferred from the clip to the breech bolt by means of a loading lever 115 (Figs. 5-8) which is fixed on a shaft 116 that is supported in the right side plate of the casing and in a bracket 117 (Fig. 10) secured to the top plate. A spring 118 secured to the casing and connected to a depending arm 119 of the lever 115 normally holds the lever in a raised position with its rear end above the cartridge in the clip and the arm against a stop 120. A crank handle 121 rotatably mounted on the outer side of the shaft has clutch teeth 122 that are normally held out of engagement with clutch teeth 123 on the shaft by means of a spring 124. The crank handle is employed to manually operate the lever in initially loading the gun.

In order to provide for automatic loading of the gun (Figs. 7-8) a lever 125 is pivotally mounted on the breech ring and is normally held against a stop 126 by means of a spring 127. During recoil of the barrel and breech ring, the lever 125 strikes the arm 119 of the loading lever 115, and yields forwardly and downwardly to enable it to pass to the rear. During counterrecoil of the barrel and breech ring, the lever 125, being against its stop 126 and unable to yield rearwardly strikes the arm 119 and actuates the loading lever 115.

When the last round in a clip has been fired, it is desirable to hold the breech ring and barrel in retracted position. The mechanism for accomplishing this object comprises a latch 128

(Figs. 5-8) which is adapted to engage notches 129 in the breech ring. The latch is fixed on a shaft 130 (Figs. 19-21) which is journaled in the bifurcated front end of a buffer rod 131 slidably mounted in a bracket 132. Resilient washers 133 are mounted on the rear portion of the buffer rod 131 and are confined between the bracket and a nut 134 on the end of the rod. The inner end of the shaft 130 extends to about the center line of the gun and carries a vertically disposed link 135 whose upper end is connected to a rod 136 slidably supported in the feed guide 97. A head 137 the front end of the rod 136 is formed with a cam surface 138 adapted to be engaged by the pointed end 139 of the clip and displaced forwardly whereby the clip moves and holds the latch 128 out of engagement with the notches 129 in the breech ring. In the absence of a clip, a spring 140 attached to the top plate retracts the rod 136 and holds the latch in position to engage the notches 129.

In the normal position of the parts the barrel D is in battery and the breech bolt B is locked to the breech ring by the locking plates 24. In order to fire the gun, a loaded clip F is inserted in the feed guide 97 until the first round is brought up against the lever 114 which supports it in lieu of the rod 93 which was arrested by the stop 113.

A crank handle is now applied to the squared end 67 of the shaft 66 to swing the lever 65 and cause the movable cam plate 62 to be moved forwardly to the position shown in Fig. 15 to cock the hammer 53, withdraw the locking plates 24 from the notches 23 of the breech ring, to unlock the breech bolt, and by means of the projection 76 on the lever 65 and the lug 77 on the breech bolt to initiate separation of the breech bolt from the breech ring and enable the sliding latches 26 to move into position to hold the locking plates 24, which in turn hold the hammer in cocked position. The handle 78 is now grasped and the breech bolt is manually retracted to its feeding position (Fig. 6) where it is engaged and held by the trigger latch 37. The hammer is held in cocked position by the fixed cam plate 61 and by the locking plates 24 which are restrained by the latches 26.

The crank handle 121 is now acted on to depress the loading lever 115 which transfers the cartridge C from the clip F to the grooves 84 on the front face of the breech bolt where it is supported by the catch 85 in line with the firing pin and the chamber of the barrel. The spring 118 returns the loading lever to the normal raised position as soon as the crank handle is released.

When the trigger E is raised, the trigger latch 37 is withdrawn from engagement with the breech bolt which is then moved into battery by its springs 35 and seats the cartridge in the chamber of the barrel. As the bolt is about to arrive home, the stops 29 on the breech ring retract the latches 26 so that the locking plates 24 may be moved outwardly by the plungers 30 and into the notches 23 in the breech ring. The catch 85 is likewise engaged by the breech ring and moved to a position in rear of the cartridge (Fig. 27). The lugs 26 on the locking plates are now clear of the hammer and since the finger 58 on the hammer is now clear of the fixed cam plate 61, the hammer is driven forwardly by its spring 55 to strike the firing pin 51 which fires the cartridge.

During the counterrecoil of the breech bolt, the cam 88 on the bolt acts on the lever 102 to move the feed slide 101 to the right. The feed pawl 105 on the slide 101 thereby advances the clip to place the second cartridge against the lever 114 and in position to be transferred to the breech bolt, the clip being held by the stop pawl 111. As soon as the cam 88 clears the lever 102 the feed slide is moved to the left by the spring 104 in preparation for again advancing the clip.

When the cartridge in the chamber of the barrel has been fired, the barrel and breech bolt move in recoil, the bolt being unlocked when the locking plates 24 engage the inclines of the cam plates 31. As soon as the barrel moves in recoil the gun latch 36 is released into position to engage the breech bolt and hold it in retracted position. The barrel returns into battery independently the lever 125 actuating the loading lever 115. Just as the barrel arrives in battery it strikes the head 45 on the rod 43 to cause withdrawal of the latch 36 and release of the breech bolt providing the trigger latch 37 is withdrawn.

The breech bolt in returning into battery operates the feed mechanism in the manner described in connection with feeding the first round. When the second round is moved onto the breech bolt it will eject the empty cartridge case which was extracted from the barrel.

I claim:

1. In a gun, a casing, a gun barrel mounted in the casing for reciprocal movement, a breech bolt mounted in the casing for reciprocal movement, a pair of locking plates pivotally mounted in the bolt and movable into locking engagement with the barrel, latches for holding the locking plates in unlocked position, said latches engageable with the barrel and moved thereby to release the locking plates, a hammer pivotally mounted in the bolt, a hammer spring, and a lug on each locking plate interposed in the path of the hammer when the locking plates are in unlocked position.

2. In a gun, a casing, a gun barrel mounted in the casing for reciprocal movement, a breech bolt mounted in the casing for reciprocal movement, a pair of locking plates pivotally mounted in the bolt and movable into locking engagement with the barrel, latches for holding the locking plates in unlocked position, said latches engageable with the barrel and moved thereby to release the locking plates.

3. In a gun, a casing, a gun barrel mounted in the casing for reciprocal movement, a breech bolt mounted in the casing for reciprocal movement, locking plates pivotally carried by the breech bolt and movable into locking engagement with the barrel, cam plates for moving the locking plates out of engagement with the barrel during recoil of the barrel and breech bolt, a hammer pivotally mounted in the breech bolt, means for cocking the hammer during recoil of the breech bolt, a cam plate movably carried by the casing, a lever engageable with the cam plate and adapted to move it forwardly and upwardly to cock the hammer, said lever also engageable with the breech bolt to initiate its separation from the gun barrel, and means actuated by the movable cam plate for moving the locking plates out of engagement with the gun barrel.

4. In a gun, a casing, a gun barrel mounted in the casing for reciprocal movement, a breech bolt mounted in the casing for reciprocal movement, locking plates pivotally carried by the breech bolt and movable into locking engagement with the barrel, cam plates for moving the locking plates out of engagement with the barrel during recoil of the barrel and breech bolt, a hammer pivotally mounted in the breech bolt, means for cocking the hammer during recoil of the breech bolt, a cam plate movably carried by the casing, a lever engageable with the cam plate and adapted to move it forwardly and upwardly to cock the hammer, and means actuated by the movable cam plate for moving the locking plates out of engagement with the gun barrel.

5. In a gun, a casing, a gun barrel mounted in the casing for reciprocal movement, a breech bolt mounted in the casing for reciprocal movement, locking plates pivotally carried by the breech bolt and movable into locking engagement with the barrel, cam plates for moving the locking plates out of engagement with the barrel during recoil of the barrel and breech bolt, a hammer pivotally mounted in the breech bolt, means for cocking the hammer during recoil of the breech bolt, and manually operable means for first cocking the hammer and then unlocking the locking plates with the parts in battery.

6. In a gun, a casing, a gun barrel mounted in the casing for reciprocal movement, a breech bolt mounted in the casing for reciprocal movement and having a recess, a trigger carried by the casing, a first latch controlled by the trigger and movable into the recess of the breech bolt to hold it in retracted position for receiving a cartridge, a second latch engageable in the recess of the breech bolt to hold it in retracted position, means under control of the gun barrel when in battery for holding the second latch out of engagement with the breech bolt and a buffer mechanism for carrying the latches.

7. In a gun, a casing having a cartridge feedway, a reciprocal breech bolt in the casing and having a cam, a guide disposed transversely of the casing and fixed thereto, a feed slide reciprocally mounted in the guide, a feed lever carried by the slide and engageable by the cam on the breech bolt in counterrecoil to advance the slide, a spring for retracting the slide to initial position, a feed pawl carried by the slide, a cartridge-carrying clip movable in the guide and advanced step by step by the feed pawl, a stop pawl carried by the guide for holding the clip, and manually operated means for disengaging the feed pawl from the clip.

8. In a gun, a casing having a cartridge feedway, a reciprocal breech bolt in the casing and having a cam, a guide disposed transversely of the casing and fixed thereto, a feed slide reciprocally mounted in the guide, a feed lever carried by the slide and engageable by the cam on the breech bolt in counterrecoil to advance the slide, a spring for retracting the slide to initial position, a feed pawl carried by the slide, a cartridge carrying clip moveable in the guide and advanced step by step by the feed pawl, and a stop pawl carried by the guide for holding the clip.

9. In a gun, a casing having a cartridge feedway, a cartridge carrying clip movable through the feedway, a cartridge supporting rod slidably mounted in the clip, means on the casing for engaging the rod to cause its removal from the clip as the clip moves through the feedway, and a spring-pressed lever carried by the casing for supporting a cartridge when the rod is removed.

10. In a gun, a casing having a cartridge feedway, a cartridge-carrying clip movable through the feedway, a cartridge supporting member slidably mounted in the clip, and means on the casing for causing removal of said member from cartridge supporting position as the clip moves through the feedway.

11. In a gun, a casing, a gun barrel mounted in the casing for reciprocal movement, a breech bolt mounted in the casing for reciprocal movement, a feed guide carried by the casing, a cartridge-carrying clip movable through the feed guide, a buffer rod slidably carried in the casing, a latch carried by the rod, a spring normally holding the latch in position to engage the barrel and hold it in retracted position, and a member connected to the latch and engageable by a clip in the feed guide to hold the latch out of engagement with the barrel.

12. In a gun, a casing, a gun barrel mounted in the casing for reciprocal movement, a breech bolt mounted in the casing for reciprocal movement, a feed guide carried by the casing, a cartridge carrying clip movable through the feed guide, a latch carried by the casing, a spring normally holding the latch in position to engage the barrel and hold it in retracted position, and a member connected to the latch and engageable by a clip in the feed guide to hold the latch out of engagement with the barrel.

13. In a gun, a casing having a cartridge feedway, a lever pivotally mounted in the casing and having a cartridge-engaging portion, a spring normally holding the lever with its cartridge-engaging portion in an elevated position, a gun barrel mounted in the casing for reciprocal movement, means on the gun barrel for depressing the lever during counterrecoil of the gun barrel, and manually operated means for depressing the lever.

14. In a gun, a casing having a cartridge feedway, a lever pivotally mounted in the casing and having a cartridge-engaging portion, a spring normally holding the lever with its cartridge-engaging portion in an elevated position, a gun barrel mounted in the casing for reciprocal movement, and means on the gun barrel for depressing the lever during counterrecoil of the gun barrel.

THOMAS A. CONLON.